United States Patent
Tang et al.

(10) Patent No.: US 12,007,648 B2
(45) Date of Patent: Jun. 11, 2024

(54) BACKLIGHT MODULE, LIQUID CRYSTAL DISPLAY SCREEN, AND USING METHOD THEREOF

(71) Applicant: WUHAN CHINA STAR OPTOELECTRONICS TECHNOLOGY CO., LTD., Wuhan (CN)

(72) Inventors: Quan Tang, Wuhan (CN); Jiang He, Wuhan (CN); Guanghui Liu, Wuhan (CN)

( * ) Notice: Subject to any disclaimer, the term of this patent is extended or adjusted under 35 U.S.C. 154(b) by 543 days.

(21) Appl. No.: 17/259,171

(22) PCT Filed: Nov. 24, 2020

(86) PCT No.: PCT/CN2020/131128
§ 371 (c)(1),
(2) Date: Jan. 10, 2021

(87) PCT Pub. No.: WO2022/068025
PCT Pub. Date: Apr. 7, 2022

(65) Prior Publication Data
US 2022/0397799 A1 Dec. 15, 2022

(30) Foreign Application Priority Data
Sep. 29, 2020 (CN) .......................... 202011045434.5

(51) Int. Cl.
*G02F 1/13357* (2006.01)
*G02F 1/1333* (2006.01)
*G06V 40/13* (2022.01)

(52) U.S. Cl.
CPC .... *G02F 1/133615* (2013.01); *G02F 1/13338* (2013.01); *G06V 40/1318* (2022.01); *G02F 2203/01* (2013.01)

(58) Field of Classification Search
CPC .......... G02F 1/133615; G02F 1/13338; G02F 2203/01
USPC .......................................... 349/12
See application file for complete search history.

(56) References Cited

U.S. PATENT DOCUMENTS

| 2015/0124199 | A1 | 5/2015 | Su et al. | |
|---|---|---|---|---|
| 2021/0072599 | A1* | 3/2021 | Mei | G02F 1/133626 |
| 2021/0181402 | A1* | 6/2021 | Ota | G02B 6/0051 |
| 2021/0407440 | A1* | 12/2021 | Liu | G02F 1/133603 |
| 2022/0368785 | A1* | 11/2022 | Aoki | H04N 23/55 |

FOREIGN PATENT DOCUMENTS

| CN | 109541849 A | 3/2019 |
|---|---|---|
| CN | 110187559 A | 8/2019 |
| CN | 110208976 A | 9/2019 |

(Continued)

*Primary Examiner* — Charles S Chang

(57) ABSTRACT

In a backlight module, a liquid crystal display screen, and a using method thereof provided, the liquid crystal display screen includes a liquid crystal display panel, a backlight module switchable between a transparent state and a backlight state, and an optical component. Without disrupting full screen display and increasing a possibility of cellphone damages, the backlight module may solve a problem that the liquid crystal display screen is opaque to light, such that the screen is normally displayed, and the optical component is operated on the same liquid crystal display screen.

16 Claims, 11 Drawing Sheets

(56) References Cited

FOREIGN PATENT DOCUMENTS

| | | |
|---|---|---|
| CN | 110471211 A | 11/2019 |
| CN | 210894924 U | 6/2020 |
| JP | 2007073226 A | 3/2007 |

* cited by examiner

When an optical component receives light, the light from outside of the liquid crystal display screen passes the liquid crystal display panel and the backlight module in sequence and reaches the optical component, such that the optical component receives the light from outside of the liquid crystal display screen — 201

When the optical component does not receive light, a path of the light emitted by the backlight module is changed to form a uniform plane light source, so that the backlight module provides backlight for the liquid crystal display panel as a backlight source — 202

FIG. 16

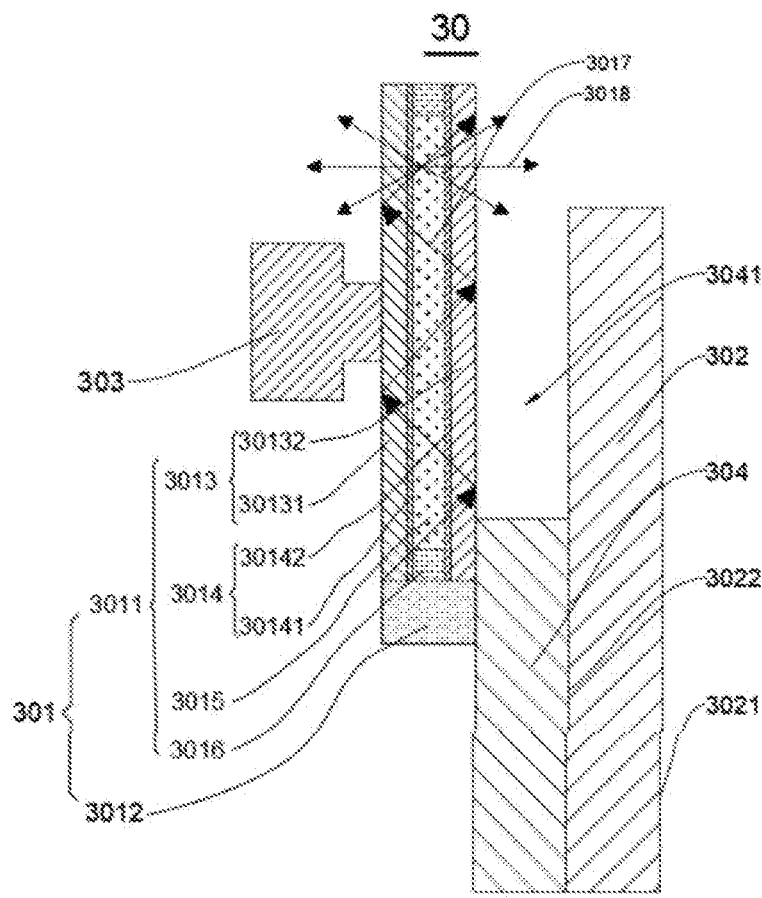

FIG. 17

BACKLIGHT MODULE, LIQUID CRYSTAL DISPLAY SCREEN, AND USING METHOD THEREOF

FIELD OF INVENTION

The present disclosure relates to display technology, and especially relates to a backlight module, a liquid crystal display screen, and an using method thereof.

BACKGROUND OF INVENTION

At present, full screen display technology has become the main direction of development of liquid crystal display screen. Full screen display has various advantages such as having large viewable areas, high screen-to-body ratios, and fine display effects. Therefore, the full screen display technology has attracted wide attention in application fields such as cellphones.

However, with regard to demand of those devices for an optical component disposed on a front surface of the device, such as a selfie camera, an optical fingerprint reader, a light/distance sensor, or an infrared camera, liquid crystal display screens of conventional design can only reserve a notch or an opening on the screen or pop the optical components described above by pop-up means, due to their characteristic of being opaque to light. The former of these two solutions disrupts an integrality of the full screen display, while the latter leaves mechanical structures in the cellphones, and thus reduces internal space of the cellphones, and increases a possibility of cellphone damages and repair costs of the cellphones.

Therefore, how to solve a technical problem that conventional liquid crystal display screens are opaque to light, without disrupting the integrality of the full screen display and increasing the possibility of cellphone damages and the repair costs of the cellphones, is a difficult problem which screen manufacturers all over the world are working hard to overcome.

Technical Problem

The present disclosure provides a backlight module, a liquid crystal display screen, and an using method thereof that may solve a technical problem that conventional liquid crystal display screens are opaque to light, without disrupting an integrality of a full screen display and increasing a possibility of cellphone damages and repair costs of cellphones.

SUMMARY OF INVENTION

Solution to the Problem

Technical Solution

The embodiments of the present disclosure provide a backlight module, comprising a first backlight component and a second backlight component, wherein the first backlight component and the second backlight component are disposed opposite each other, the second backlight component includes a first side and a second side opposite each other, and the first backlight component is disposed on the first side or the second side; or wherein the first backlight component and the second backlight component are disposed in parallel, the second backlight component includes a first end and a second end opposite each other, and the first backlight component is disposed at the first end or the second end;

wherein the first backlight component includes an adjustable transparent panel and a light emitting diode light strip disposed at one end of the adjustable transparent panel;

when the light emitting diode light strip switches on and the adjustable transparent panel is in a backlight state, a path of light emitted by the light emitting diode light strip towards the adjustable transparent panel is changed to form a uniform plane light source; and when the light emitting diode light strip switches off and the adjustable transparent panel is in a transparent state, light from outside of the backlight module is transmitted through the adjustable transparent panel.

In the backlight module provided by the embodiments of the present disclosure, the adjustable transparent panel includes transparent base electrodes, indium tin oxide electrodes, and a light-scattering material layer;

wherein the transparent base electrodes include a first transparent base electrode and a second transparent base electrode disposed opposite each other;

wherein the indium tin oxide electrodes are disposed between the first transparent base electrode and the second transparent base electrode, the indium tin oxide electrodes include a first indium tin oxide electrode and a second indium tin oxide electrode, and the first transparent base electrode and the second transparent base electrode are disposed opposite each other;

and wherein the light-scattering material layer is disposed between the first indium tin oxide electrode and the second indium tin oxide electrode.

In the backlight module provided by the embodiments of the present disclosure, when a first voltage is applied to the indium tin oxide electrodes, light-scattering material in the light-scattering material layer is excited, and scatters light emitted by the light emitting diode light strip towards the adjustable transparent panel, so as to change the path of the light emitted by the light emitting diode light strip towards the adjustable transparent panel, and form the uniform plane light source; and when a second voltage is applied to the indium tin oxide electrodes, the light-scattering material in the light-scattering material layer is not excited, the adjustable transparent panel is in the transparent state, and light from outside of the adjustable transparent panel is transmitted through the adjustable transparent panel.

In the backlight module provided by the embodiments of the present disclosure, the adjustable transparent panel further includes a plastic frame, the plastic frame is disposed at an end of the light-scattering material layer away from the light emitting diode light strip and at an end of the light-scattering material layer close to the light emitting diode light strip, and is disposed between the first indium tin oxide electrode and the second indium tin oxide electrode.

In the backlight module provided by the embodiments of the present disclosure, the second backlight component is disposed on the first side, a through hole is formed in a middle portion of the second backlight component, and the first backlight component covers the through hole.

In the backlight module provided by the embodiments of the present disclosure, the second backlight component is disposed on the second side, a through hole is formed in a middle portion of the second backlight component, and the first backlight component includes a first part and a second part disposed at both ends of the first part; wherein the first part is disposed opposite the through hole, the first part is in the transparent state or the backlight state, and the second part is in the transparent state.

The embodiments of the present disclosure also provide a liquid crystal display screen, comprising:
  a liquid crystal display panel including a first surface and a second surface opposite each other; and
  a backlight module disposed on the second surface of the liquid crystal display panel and including a first backlight component and a second backlight component, wherein the first backlight component and the second backlight component are disposed opposite each other, the second backlight component includes a first side and a second side opposite each other, and the first backlight component is disposed on the first side or the second side; or wherein the first backlight component and the second backlight component are disposed in parallel, the second backlight component includes a first end and a second end opposite each other, and the first backlight component is disposed at the first end or the second end.

In the liquid crystal display screen provided by the embodiments of the present disclosure, when the first backlight component is in a backlight state, a path of light emitted by the first backlight component is changed to form a uniform plane light source, so that the first backlight component provides backlight for the liquid crystal display panel as a backlight source; and when the first backlight component in a transparent state, light from inside and outside of the liquid crystal display screen is transmitted through the liquid crystal display panel and the backlight module.

In the liquid crystal display screen provided by the embodiments of the present disclosure, the first backlight component includes an adjustable transparent panel and a light emitting diode light strip disposed at one end of the adjustable transparent panel;
  when the light emitting diode light strip switches on and the adjustable transparent panel is in the backlight state, a path of light emitted by the light emitting diode light strip towards the adjustable transparent panel is changed to form the uniform plane light source; and
  when the light emitting diode light strip switches off and the adjustable transparent panel in the transparent state, light from outside of the backlight module is transmitted through the adjustable transparent panel.

In the liquid crystal display screen provided by the embodiments of the present disclosure, the adjustable transparent panel includes transparent base electrodes, indium tin oxide electrodes, and a light-scattering material layer;
  wherein the transparent base electrodes include a first transparent base electrode and a second transparent base electrode disposed opposite each other;
  wherein the indium tin oxide electrodes are disposed between the first transparent base electrode and the second transparent base electrode, the indium tin oxide electrodes include a first indium tin oxide electrode and a second indium tin oxide electrode, and the first transparent base electrode and the second transparent base electrode are disposed opposite each other;
  and wherein the light-scattering material layer is disposed between the first indium tin oxide electrode and the second indium tin oxide electrode.

In the liquid crystal display screen provided by the embodiments of the present disclosure, when a first voltage is applied to the indium tin oxide electrodes, light-scattering material in the light-scattering material layer is excited, and scatters light emitted by the light emitting diode light strip towards the adjustable transparent panel, so as to change the path of the light emitted by the light emitting diode light strip towards the adjustable transparent panel, and form the uniform plane light source; and
  when a second voltage is applied to the indium tin oxide electrodes, the light-scattering material in the light-scattering material layer is not excited, the adjustable transparent panel is in the transparent state, and light from outside of the adjustable transparent panel is transmitted through the adjustable transparent panel.

In the liquid crystal display screen provided by the embodiments of the present disclosure, the adjustable transparent panel further includes a plastic frame, the plastic frame is disposed at an end of the light-scattering material layer away from the light emitting diode light strip and at an end of the light-scattering material layer close to the light emitting diode light strip, and is disposed between the first indium tin oxide electrode and the second indium tin oxide electrode.

In the liquid crystal display screen provided by the embodiments of the present disclosure, the liquid crystal display screen further comprises an optical component disposed on a surface of the first backlight component, and the surface is away from the liquid crystal display panel.

In the liquid crystal display screen provided by the embodiments of the present disclosure, the second backlight component includes a shading layer and a backlight layer disposed on one side of the shading layer, and the shading layer is disposed on a side of the second backlight component away from the liquid crystal display panel.

In the liquid crystal display screen provided by the embodiments of the present disclosure, the second backlight component is disposed on the first side, a through hole is formed in a middle portion of the second backlight component, the first backlight component covers the through hole, and an optical component is disposed opposite the through hole.

In the liquid crystal display screen provided by the embodiments of the present disclosure, the second backlight component is disposed on the second side, a through hole is formed in a middle portion of the second backlight component, and an optical component is disposed inside the through hole; wherein the first backlight component includes a first part and a second part disposed at both ends of the first part; wherein the first part is disposed opposite the through hole, the first part is in a transparent state or a backlight state, and the second part is in the transparent state.

In the liquid crystal display screen provided by the embodiments of the present disclosure, the optical component includes one or more of a camera, an optical fingerprint reader, a light sensor, and a distance sensor.

The embodiments of the present disclosure also provide a method for using a liquid crystal display screen, wherein the liquid crystal display screen comprises a liquid crystal display panel and a backlight module; wherein the liquid crystal display panel includes a first surface and a second surface opposite each other; wherein the backlight module is disposed on the second surface of the liquid crystal display panel and includes a first backlight component and a second backlight component, the first backlight component and the second backlight component are disposed opposite each other, the second backlight component includes a first side and a second side opposite each other, and the first backlight component is disposed on the first side or the second side; or wherein the first backlight component and the second backlight component are disposed in parallel, the second backlight component includes a first end and a second end opposite each other, and the first backlight component is disposed at the first end or the second end;

the method comprises following steps:

when an optical component receives light, light from outside of the liquid crystal display screen passing the liquid crystal display panel and the backlight module in sequence and reaching the optical component, such that the optical component receives the light from outside of the liquid crystal display screen; and when the optical component does not receive light, a path of light emitted by the backlight module changing to form a uniform plane light source, so that the backlight module provides backlight for the liquid crystal display panel as a backlight source.

In the method for using a liquid crystal display screen provided by the embodiments of the present disclosure, when the optical component is a camera, the light from outside of the liquid crystal display screen passes the liquid crystal display panel and the backlight module in sequence and reaches the camera, so that the camera receives the light from outside of the liquid crystal display screen to form an image.

In the method for using a liquid crystal display screen provided by the embodiments of the present disclosure, when the optical component is an optical fingerprint reader, the light from outside of the liquid crystal display screen passes the liquid crystal display panel and the backlight module in sequence and reaches the optical fingerprint reader, so that the optical fingerprint reader receives the light from outside of the liquid crystal display screen, and switches on a light emitting diode light disposed on the optical fingerprint reader to acquire a fingerprint image.

Beneficial Effects of the Present Disclosure

Beneficial Effects

In the backlight module, the liquid crystal display screen, and the using method thereof provided by the embodiments of the present disclosure, by disposing the backlight module switchable between the transparent state and the backlight state, and by making the backlight module being in the transparent state, in which the light from inside and outside of the liquid crystal display screen may be transmitted through the liquid crystal display screen and the backlight module, when using the optical component, the normal usage of the optical component is not affected, whereas when the liquid crystal display panel needs the backlight, the backlight module is made to be in the backlight state, in which the backlight module provides the backlight for the liquid crystal display panel as the backlight source. Therefore, by applying the backlight module switchable between the transparent state and the backlight state, normal display and usage of the optical component may be operated on the same liquid crystal display screen, and an implementation of a true mechanical-structure-free liquid crystal full screen display is made possible. In addition, the backlight module does not need to reserve a notch or an opening on the liquid crystal display screen or pop the optical component by pop-up means, and therefore does not disrupt the integrity of the full screen display or increase the possibility of cellphone damages and the repair costs of the cellphones. Therefore, the liquid crystal display screen provided by the embodiments of the present disclosure may solve the technical problem that the conventional liquid crystal display screens are opaque to light, without disrupting the integrity of the full screen display and increasing the possibility of cellphone damages and the repair costs of the cellphones.

DESCRIPTION OF DRAWINGS

By describing the embodiments of the present disclosure in detail in conjunction with the drawings, the technical solution of the present disclosure and the beneficial effect of the technical solution is made apparent to those skilled in the art. In the drawings:

FIG. 16 is a schematic flow chart of a method for using the liquid crystal display screen provided by the embodiments of the present disclosure.

FIG. 17 is a first structural schematic view of a liquid crystal display screen applying a camera provided by the embodiments of the present disclosure.

DETAILED DESCRIPTION OF PREFERRED EMBODIMENTS

Embodiments of the Present Disclosure

In the following description, the technical solutions in the embodiments of the present disclosure are described clearly and completely in conjunction with the drawings in the embodiments of the present disclosure. Obviously, the embodiments described herein are only a part of the embodiments of the present disclosure instead of all embodiments of the present disclosure. Based on the embodiments in the present disclosure, all other embodiments obtained by those skill in the art without making creative effort fall within the scope of protection of the present disclosure.

Figure 1:
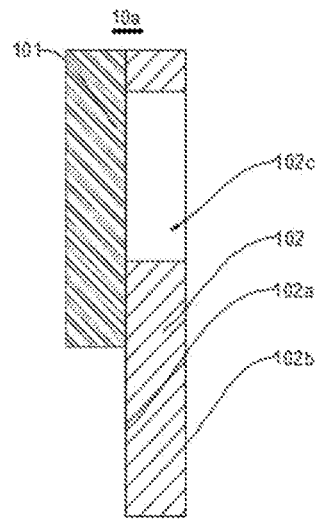
FIG. 1 is a first structural schematic view of a backlight module provided by the embodiments of the present disclosure.

Specifically, refer to FIG. 1. FIG. 1 is a first structural schematic view of a backlight module provided by the embodiments of the present disclosure. As shown in FIG. 1, a backlight module 10*a* provided by the embodiments of the present disclosure comprises a first backlight component 101 and a second backlight component 102. Wherein, the first backlight component 101 and the second backlight component 102 are disposed opposite each other, the second backlight component 102 includes a first side 102*a* and a second side 102*b* opposite each other, and the first backlight component 101 is disposed on the first side 102*a*. A through hole 102*c* is formed in a middle portion of the second backlight component 102, and the first backlight component 101 covers the through hole 102*c*.

Wherein, it is understandable that when the first backlight component 101 is in a backlight state, a path of light emitted by the first backlight component 101 is changed to form a uniform plane light source, so that the first backlight component 101 provides backlight as a backlight source, and when the first backlight component 101 is in a transparent state, light from inside and outside of the first backlight component 101 may be transmitted through the first backlight component 101. Meanwhile, the through hole 102*c* is formed in the second backlight component 102, and therefore light from inside and outside of the first backlight component 101 may also be transmitted through the through hole 102*c* formed in the second backlight component 102. At this time, light from inside and outside of the backlight module 10*a* may be transmitted through the backlight module 10*a*.

Therefore, by applying a structure of the first backlight component 101, the light from inside and outside of a liquid crystal display screen may be transmitted through a liquid crystal display panel and a backlight module 10*a* without a reservation of a notch or an opening on the liquid crystal display panel 10*b*, and therefore may solve a technical problem that liquid crystal display screens in conventional deices are opaque to light, without disrupting an integrality of the full screen display and increasing a possibility of cellphone damages and repair costs of cellphones.

Figure 2:
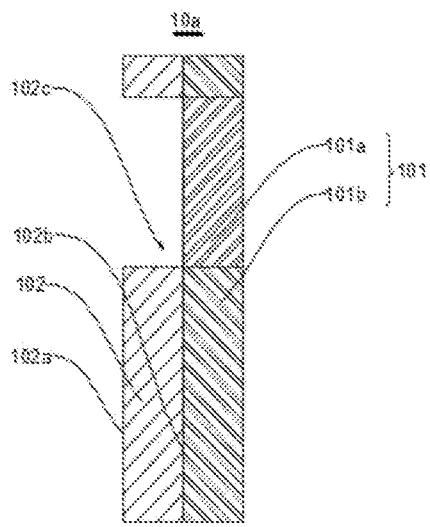
FIG. 2 is a second structural schematic view of the backlight module provided by the embodiments of the present disclosure.

Specifically, refer to FIG. 2. FIG. 2 is a second structural schematic view of the backlight module provided by the embodiments of the present disclosure. As shown in FIG. 2, the backlight module 10*a* provided by the embodiments of the present disclosure comprises the first backlight component 101 and the second backlight component 102. Wherein, the first backlight component 101 and the second backlight component 102 are disposed opposite each other, the second backlight component 102 includes the first side 102*a* and the second side 102*b* opposite each other, and the first backlight component 101 is disposed on the second side 102*b*. The through hole 102*c* is formed in the middle portion of the second backlight component 102, and the first backlight component 101 includes a first part 101*a* and a second part 101*b* disposed at both ends of the first part 101*a*. Wherein, the first part 101*a* is disposed opposite the through hole 102*c*, the first part 101*a* is in the transparent state or the backlight state, and the second part 101*b* is in the transparent state.

Wherein, it is understandable that when the first backlight component 101 is in the backlight state, the path of the light emitted by the first backlight component 101 is changed to form the uniform plane light source, so that the first backlight component 101 provides backlight as the backlight source, and when the first backlight component 101 is in the transparent state, the light from inside and outside of the first backlight component 101 may be transmitted through the first backlight component 101. Meanwhile, the through hole 102*c* is formed in the second backlight component 102, and therefore the light from inside and outside of the first backlight component 101 may also be transmitted through the through hole 102*c* formed in the second backlight component 102. At this time, the light from inside and outside of the backlight module 10*a* may be transmitted through the backlight module 10*a*.

Figure 3:
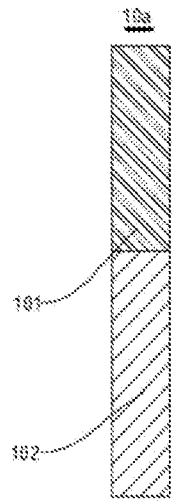
FIG. 3 is a third structural schematic view of the backlight module provided by the embodiments of the present disclosure.

Specifically, refer to FIG. 3. FIG. 3 is a third structural schematic view of the backlight module provided by the embodiments of the present disclosure. As shown in FIG. 3, the backlight module 10*a* provided by the embodiments of the present disclosure comprises the first backlight component 101 and the second backlight component 102. Wherein, the first backlight component 101 and the second backlight component 102 are disposed in parallel, the second backlight component 102 includes a first end and a second end disposed opposite each other, and the first backlight component 101 is disposed at the first end or the second end.

Figure 4:
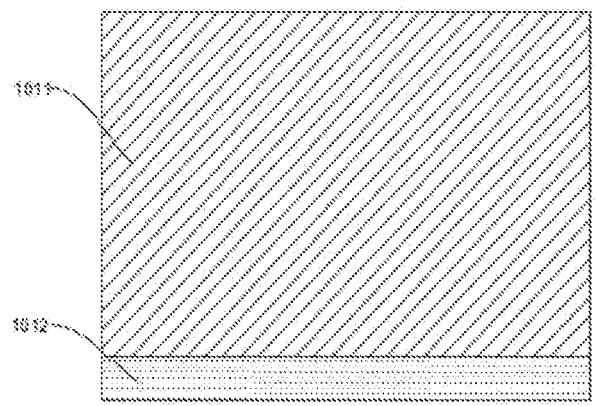
FIG. 4 is a front view of a first backlight component provided by the embodiments of the present disclosure.
Figure 5:
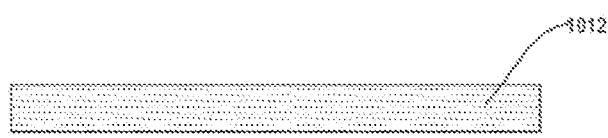
FIG. 5 is a top view of the first backlight component provided by the embodiments of the present disclosure.
Figure 6:
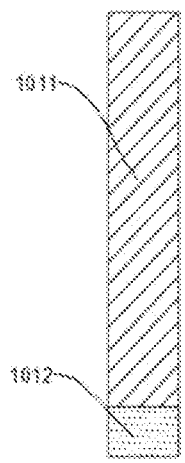
FIG. 6 is a side view of the first backlight component provided by the embodiments of the present disclosure.

Wherein, it is understandable that when the first backlight component 101 is in the backlight state, the path of the light emitted by the first backlight component 101 is changed to form the uniform plane light source, so that the first backlight component 101 provides backlight as the backlight source, and when the first backlight component 101 is in the transparent state, the light from inside and outside of the first backlight component 101 may be transmitted through the first backlight component 101. Because the second backlight component 102 and the first backlight component 101 are disposed in parallel, the second backlight component 102 does not affect transmission of first backlight component 101 through the first backlight component 101. Therefore, the light from inside and outside of the backlight module 10*a* may be transmitted through the backlight module. Specifically, refer to FIG. 4, FIG. 5, and FIG. 6, among which FIG. 4 is a front view of the first backlight component provided by the embodiments of the present disclosure, FIG. 5 is a top view of the first backlight component provided by the embodiments of the present disclosure, and FIG. 6 is a side view of the first backlight component provided by the embodiments of the present disclosure. As shown in FIG. 4, FIG. 5, and FIG. 6, the embodiments of the present disclosure provide the first backlight component 101, the first backlight component 101 includes an adjustable transparent panel 1011 and a light emitting diode light strip 1012 disposed at one end of the adjustable transparent panel 1011.

Wherein, it is understandable that when the light emitting diode light strip 1012 is switched on and the adjustable transparent panel 1011 is in the backlight state, the path of the light emitted by the light emitting diode light strip 1012 towards the adjustable transparent panel 1011 is changed to form the uniform plane light source. Wherein, the adjustable transparent panel 1011 being in the backlight state means that the adjustable transparent panel 1011 in that state can change the transmission path of light and can break total reflection of the light. Wherein, the state that changes the transmission path of the light can be a scattering or a diffraction.

Wherein, it is understandable that when the light emitting diode light strip 1012 is switched off and the adjustable transparent panel 1011 is in the transparent state, the light from outside of the first backlight component 101 may be transmitted through the adjustable transparent panel 1011. Wherein, the adjustable transparent panel 1011 being in the transparent state means that the adjustable transparent panel 1011 in that state is transparent, cannot change the transmission path of the light, and cannot block the transmission path of the light. Wherein, "not changing the transmission path of the light" does not account for the refraction and reflection caused by the difference in refractive indexes.

Wherein, in one implementation, the light emitting diode light strip 1012 is secured to the adjustable transparent panel 1011 by gluing. Certainly, the light emitting diode light strip 1012 may also be secured to the adjustable transparent panel 1011 by other means as long as the light emitting diode light strip 1012 can be secured to the adjustable transparent panel 1011 without detachment or wobbling.

Wherein, it is understandable that there is no specific requirement with regard to shape and size of the adjustable transparent panel 1011, as long as the shape and size of the adjustable transparent panel 1011 match with shape and size of the first backlight component 101.

Figure 7:
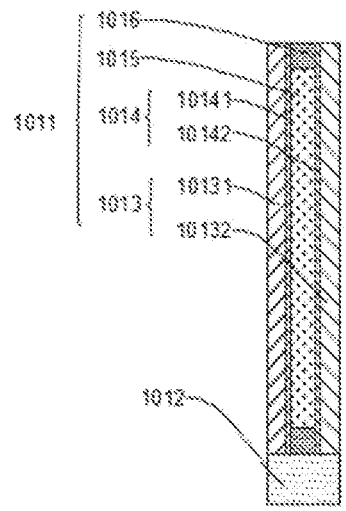
FIG. 7 is a structural schematic view of the first backlight component provided by the embodiments of the present disclosure.

Specifically, refer to FIG. 7. FIG. 7 is a structural schematic view of the first backlight component provided by the embodiments of the present disclosure. As shown in FIG. 4, the first backlight component 101 provided by the embodiments of the present disclosure includes the adjustable transparent panel 1011 and the light emitting diode light strip 1012 disposed at one end of the adjustable transparent panel 1011. Wherein, the adjustable transparent panel 1011 includes transparent base electrodes 1013, indium tin oxide electrodes 1014, a light-scattering material layer 1015, and a plastic frame 1016. The transparent base electrodes 1013 include a first transparent base electrode 10131 and a second transparent base electrode 10132 disposed opposite each other. The indium tin oxide electrodes 1014 are disposed between the first transparent base electrode 10131 and the second transparent base electrode 10132, the indium tin oxide electrodes 1014 include a first indium tin oxide electrode 10141 and a second indium tin oxide electrode 10142 disposed opposite each other. The light-scattering material layer 1015 is disposed between the first indium tin oxide electrode 10141 and the second indium tin oxide electrode 10142. The plastic frame 1016 is disposed at the end of the light-scattering material layer 1015 away from the light emitting diode light strip 1012 and at the end of the light-scattering material layer 1015 close to the light emitting diode light strip 1012, and is disposed between the first indium tin oxide electrode 10141 and the second indium tin oxide electrode 10142.

Wherein, in an implementation, the adjustable transparent panel 1011 provided by the embodiments of the present disclosure is a scattering-type adjustable transparent panel. The scattering-type adjustable transparent panel refers to the adjustable transparent panel that can scatter light coming from the light emitting diode light strip 1012 when the adjustable transparent panel 1011 is in the backlight state. Certainly, the light coming from the light emitting diode light strip 1012 can form the uniform plane light source after a scattering adjustment done by the adjustable transparent panel 1011.

Wherein, it is understandable that the light-scattering material layer 1015 is made of light-scattering material, a first voltage is a voltage that can make the light-scattering material in the light-scattering material layer 1015 scatter light, and a second voltage is a voltage that can make the light-scattering material in the light-scattering material layer 1015 not scatter light. In addition, one can control whether the light-scattering material in the light-scattering material layer 1015 scatters light by controlling whether a voltage is applied to the indium tin oxide electrodes 1014. Therefore, generally, the first voltage is a voltage greater than zero volt and the second voltage is a voltage that is zero volt.

Therefore, when the first voltage is applied to the indium tin oxide electrodes 1014, the light-scattering material in the light-scattering material layer 1015 is made to scatter light emitted from the light emitting diode light strip 1012 to the adjustable transparent panel 1011, thereby changing a transmission path of the light emitted from the light emitting diode light strip 1012, and thereby making the light form the uniform light source.

When the second voltage is applied to the indium tin oxide electrodes 1014, the light-scattering material in the light-scattering material layer 1015 is not excited, and therefore cannot change the transmission path of the light emitted towards the adjustable transparent panel 1011. Then, the light emitting diode light strip 1012 is switched off, and the light from outside of the adjustable transparent panel 1011 may be transmitted through the adjustable transparent panel 1011.

Wherein, it is understandable that disposing the plastic frame 1016 at both the end of the light-scattering material layer 1015 away from the light emitting diode light strip 1012 and at the end of the light-scattering material layer 1015 close to the light emitting diode light strip 1012 is mainly for sealing the light-scattering material in the light-scattering material layer 1015, thereby preventing the light-scattering material from leaking from the light-scattering material layer 1015, and therefore being unable to scatter light emitted from the light emitting diode light strip 1012 to the adjustable transparent panel 1011, during a movement of the adjustable transparent panel 1011.

In the first backlight component provided by the embodiments of the present disclosure, the first backlight component is switchable between the transparent state and the backlight state. When the first backlight component is in the transparent state, the light from inside and outside of the liquid crystal display screen can be transmitted through the first backlight component. When the first backlight component is in the backlight state, light emitted by the first backlight component forms the uniform plane light source to provide backlight for the liquid crystal display panel as the backlight source. Therefore, by applying the first backlight component switchable between the transparent state and the backlight state, normal display and the usage of an optical component can be achieved on the same liquid crystal display screen, and thus provides a possibility for the implementation of a true mechanical-structure-free liquid crystal full screen display.

Figure 8:
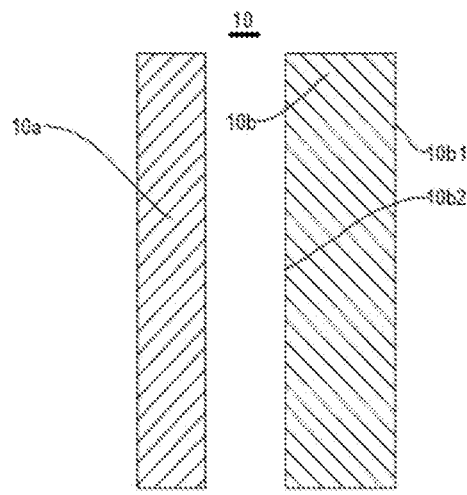
FIG. 8 is a first structural schematic view of a liquid crystal display screen provided by the embodiments of the present disclosure.

Specifically, refer to FIG. 8. FIG. 8 is a first structural schematic view of a liquid crystal display screen 10 provided by the embodiments of the present disclosure. As shown in FIG. 8, the liquid crystal display screen 10 provided by the embodiments of the present disclosure comprises the backlight module 10*a* and a liquid crystal display panel 10*b*. Wherein, the liquid crystal display panel 10*b* includes a first surface 10*b*1 and a second surface 10*b*2 disposed opposite each other, and the backlight module 10*a* is disposed on the second surface 10*b*2 of the liquid crystal display panel 10*b*.

Wherein, it is understandable that when the backlight module 10*a* is in the backlight state, the transmission path of the light emitted by the backlight module 10*a* is changed to form the uniform plane light source, so as to make the backlight module 10*a* provide backlight for the liquid crystal display screen 10 as the backlight source. When the backlight module 10*a* is in the transparent state, light from inside and outside of the liquid crystal display screen 10 can be transmitted through the liquid crystal display panel 10*b* and the backlight module 10*a*.

Therefore, by applying the structure of the backlight module 10*a*, the light from inside and outside of the liquid crystal display screen 10 can be transmitted through the liquid crystal display panel 10*b* and the backlight module 10*a* without the reservation of the notch or the opening on the liquid crystal display panel 10*b*. Thus, the technical problem that the liquid crystal display screen in the conventional device is opaque to light may be solved without disrupting the full screen display and increasing the possibility of cellphone damages and repair costs of the cellphones.

Wherein, it is understandable that the theme "conventional device" refers to device that applies liquid crystal display screen 10 as display, for example, intelligent device such as cell phone, tablet computer, etc.

Figure 9:
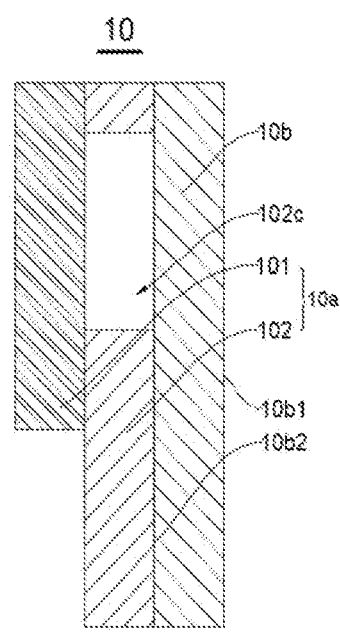
FIG. 9 is a second structural schematic view of the liquid crystal display screen provided by the embodiments of the present disclosure.

Specifically, refer to FIG. 9. FIG. 9 is a second structural schematic view of the liquid crystal display screen provided by the embodiments of the present disclosure. As shown in FIG. 9, the liquid crystal display screen 10 provided by the embodiments of the present disclosure comprises the backlight module 10*a* and the liquid crystal display panel 10*b*. Wherein, the backlight module 10*a* includes the first backlight component 101 and the second backlight component 102. Wherein, the liquid crystal display panel 10*b* includes a first surface 10*b*1 and a second surface 10*b*2 disposed opposite each other, the first backlight component 101 is disposed on the second surface 10*b*2 of the liquid crystal display panel 10*b*, the second backlight component 102 is disposed on the second surface 10*b*2 of the liquid crystal display panel 10*b*, and the through hole 102*c* is formed in the middle portion of the second backlight component 102. In addition, the first backlight component 101 is disposed on the side of the second backlight component 102 away from the liquid crystal display panel 10*b*, the first backlight component 101 covers the through hole 102*c*, and an optical component 10*c* is disposed opposite the through hole 102*c*.

Wherein, it is understandable that because a utilization of light by the first backlight component is insufficient, the second backlight component 102 may be additionally disposed between the optical component 10*c* and the liquid crystal display panel 10*b*, so as to make the second backlight component 102 also serve as the backlight source of the liquid crystal display panel 10*b*. By doing so, the liquid crystal display panel 10*b* is added with a new backlight source, and therefore, even if the utilization of light by the first backlight component 101 is insufficient, the liquid crystal display panel 10*b* can be provided with sufficient backlight with the second backlight component 102 and first backlight component 101 both serving as the backlight sources of the liquid crystal display panel 10*b*.

Wherein, it is understandable that the first backlight component 101 is disposed on the side of the second backlight component 102 away from the liquid crystal display panel 10*b*. Therefore, the light emitted by the second backlight component 102 towards the liquid crystal display panel 10*b* is not affected by the first backlight component 101.

However, the light from outside of the liquid crystal display screen 10 and the light from inside of the liquid crystal display screen 10 are both affected by the second backlight component 102 when transmitted to inside of the liquid crystal display screen 10 and outside of the liquid crystal display screen 10, respectively. Therefore, the through hole 102*c* is formed in the middle portion of the second backlight component 102. Therefore, when the first backlight component 101 is in the transparent state, both the light transmitted from outside of the liquid crystal display screen 10 to inside of the liquid crystal display screen 10 and the light transmitted from inside of the liquid crystal display screen 10 to outside of the liquid crystal display screen 10 are not affected.

Hence, not only does such disposal solve the technical problem that the utilization of light by the first backlight component 101 is insufficient, and therefore causes a deterioration in a display effect of the liquid crystal display screen 10, but also solve the technical problem that the liquid crystal display screen in the conventional device is opaque to light, without disrupting the full screen display and increasing the possibility of cellphone damages and the repair costs of the cellphone.

Wherein, in an implementation, the second backlight component 102 includes a shading layer and a backlight layer disposed on one side of the shading layer, the shading layer is disposed on the side of the second backlight component 102 away from the liquid crystal display panel 10*b*, and the backlight layer is disposed on the side of the second backlight component 102 close to the liquid crystal display panel 10*b*. Wherein, the backlight layer is used to emit backlight toward the liquid crystal display panel 10*b*, and the shading layer is used to prevent the backlight layer from emitting the backlight toward other directions whereat the liquid crystal display panel 10*b* cannot receive the backlight, thereby increasing an amount of backlight that the liquid crystal display panel 10*b* can receive, enhancing a backlight utilization of the second backlight component 102, and thereby improving the display effect of the liquid crystal display panel.

Wherein, in an implementation, one end of the first backlight component 101 is higher than the second backlight component 102, and the light emitting diode light strip 1012 is disposed at this end. Wherein, it is understandable that because the other end of the first backlight component 101 is in parallel with the other end of the second backlight component 102, a space in which the light emitting diode light strip 1012 is disposed needs to be enlarged, and therefore costs are increased, if the light emitting diode light strip 1012 is disposed at the other end. Therefore, the light emitting diode light strip 1012 is generally disposed at the end of the first backlight component 101 unparallel to the second backlight component 102.

Figure 10:
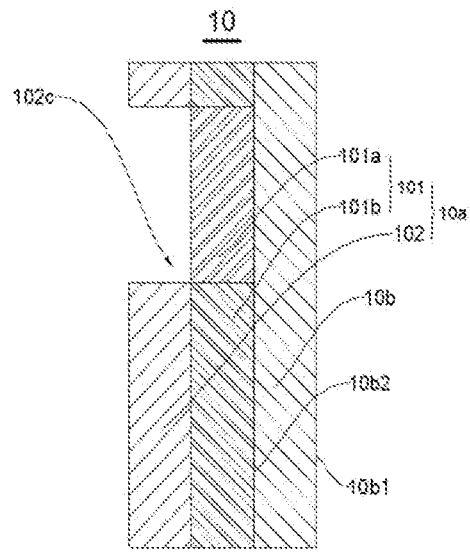
FIG. 10 is a third structural schematic view of the liquid crystal display screen provided by the embodiments of the present disclosure.

Specifically, refer to FIG. 10. FIG. 10 is a third structural schematic view of the liquid crystal display screen provided by the embodiments of the present disclosure. As shown in FIG. 10, the liquid crystal display screen 10 provided by the embodiments of the present disclosure comprises the backlight module 10a and the liquid crystal display panel 10b. Wherein, the backlight module 10a includes the first backlight component 101 and the second backlight component 102.

Wherein, the liquid crystal display panel 10b includes a first surface 1021 and a second surface 1022 disposed opposite each other, the first backlight component 101 is disposed on the second surface 1022 of the liquid crystal display panel 10b, and the second backlight component 102 is disposed on the second surface 1022 of the liquid crystal display panel 10b. The through hole 102c is formed in the middle portion of the second backlight component 102. The first backlight component 101 is disposed on the side of the second backlight component 102 close to the liquid crystal display panel 10b. The first backlight component 101 includes a first part 102a, and a second part 102b disposed at both ends of the first part 102a. Wherein, the first part 102a is disposed opposite the through hole 102c.

Wherein, it is understandable that because the first backlight component 101 is disposed on the side of the second backlight component 102 close to the liquid crystal display panel 10b, the light emitted by the second backlight component 102 to the liquid crystal display panel 10b all passes through the first backlight component 101, and therefore when the first backlight component 101 is in the backlight state and serves as the backlight source of the liquid crystal display panel 10b, the transmission path of the light that passes through the first backlight component 101 is changed. Therefore, if the first backlight component 101 remains unchanged, all the light emitted by the second backlight component 102 towards the liquid crystal display panel 10b as the backlight source is changed. In that case, the second backlight component 102 cannot serve as the backlight source of the liquid crystal display panel 10b.

Therefore, the first backlight component 101 is divided into the first part 101a, and the second part 101b disposed at both ends of the first part 101a. Wherein, the first part 101a is disposed opposite the through hole 102c, the first part 101a is in the transparent state or the backlight state, and the second part 101b is in the transparent state.

Wherein, it is understandable that the first part 101a is switchable between the transparent state and the backlight state. Therefore, when the first part 101a of the first backlight component 101 is in the transparent state, light from inside and outside of the liquid crystal display screen 10 may be transmitted through the liquid crystal display panel 10b and the first backlight component 101, and when the first part 101a of the first backlight component 101 is in the backlight state, the first backlight component 101 may serve as the backlight source of the liquid crystal display panel 10.

Wherein, it is understandable that the second part 101b is in the transparent state, and therefore the second part 101b of an adjustable transparent backlight panel 102 does not change the transmission path of the light emitted by the second backlight component 102 towards the liquid crystal display panel 10b, so the light emitted by the second backlight component 102 towards the liquid crystal display panel 10b can arrive safely. Therefore, the light received by the liquid crystal display panel 10b can be increased, thereby enhancing the display effect of the liquid crystal display panel 10b.

Wherein, in an implementation, the light emitting diode light strip 1012 is disposed at a shorter end of the second part 101b of the first backlight component 101. Wherein, it is understandable that the transmission path of the light emitted by the light emitting diode light strip needs to be adjusted by the first part 101a of the first backlight component 101, and the longer the distance the light travails through the second part 101b of the first backlight component 101, the more of the light is lost. Therefore, in order to enhance the utilization of the light emitted by the light emitting diode light strip 1012, the light emitting diode light strip 1012 is generally disposed at the shorter end of the second part 101b of the first backlight component 101. In addition, a position of a projection of the light emitting diode light strip 1012 does not coincide with the second backlight component 102. This is mainly for preventing the light emitting diode light strip 1012 from affecting the light transmitted by the second backlight component 102 to the liquid crystal display panel 10b, so as to further enhance the utilization of the light.

Figure 11:
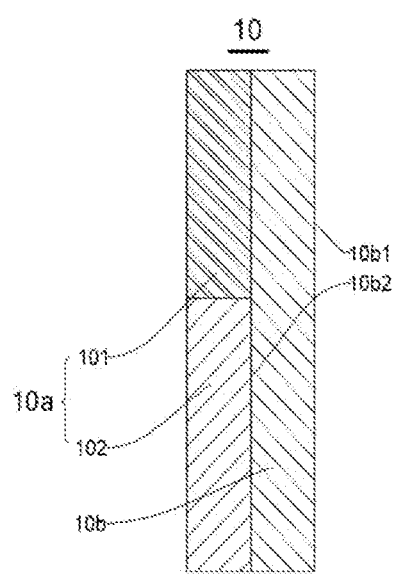
FIG. 11 is a fourth structural schematic view of the liquid crystal display screen provided by the embodiments of the present disclosure.

Specifically, refer to FIG. 11. FIG. 11 is a fourth structural schematic view of the liquid crystal display screen provided by the embodiments of the present disclosure. As shown in FIG. 11, the liquid crystal display screen 10 provided by the embodiments of the present disclosure comprises the backlight module 10a and the liquid crystal display panel 10b. Wherein, the backlight module 10a includes the first backlight component 101 and the second backlight component 102.

Wherein, the liquid crystal display panel 10b includes the first surface 102a and the second surface 102b disposed opposite each other. The first backlight component 101 is disposed on the second surface 102b of the liquid crystal display panel 10b, and the second backlight component 102 is disposed on the second surface 102b of the liquid crystal display panel 10b. The through hole 102c is formed at an edge of one end of the second backlight component 102, the first backlight component 101 is disposed inside the through hole 102c, and the first backlight component 101 and the second backlight component 102 are disposed in parallel.

Wherein, it is understandable that the first backlight component 101 and the second component 102 are disposed in parallel and without particular order. Therefore, the first backlight component 101 does not block the light that passes the second backlight component 102, and the second backlight component 102 does not block the light that passes the first backlight component 101. Therefore, both the transmission of the light from outside of the liquid crystal display screen 10 to inside of the liquid crystal display screen 10 and the transmission of the light from inside of the liquid crystal display screen 10 to outside of the liquid crystal display screen 10 are not affected by the second backlight component 102.

Therefore, by switching the first backlight component 101 between the backlight state and the transparent state, the technical problem that the liquid crystal display screen 10 of the conventional devices is opaque to light can be solved without disrupting the integrality of the full screen displays and increasing the possibility of cellphone damages and the repair costs of the cellphones.

Wherein, in an implementation, the light emitting diode light strip 1012 is disposed at the end of the first backlight component 101 away from the second backlight component 102, and the position of the projection of the light emitting diode light strip 1012 does not coincide with the liquid crystal display panel 10b. Wherein, it is understandable that, firstly, the position of the projection of the light emitting diode light strip 1012 not coinciding with the liquid crystal display panel 10b is mainly for preventing both the light emitted from inside of the liquid crystal display screen 10 to the outside of the liquid crystal display screen 10 and the light emitted from the liquid crystal display screen 10 to the inside of the liquid crystal display screen 10 from being blocked by the light emitting diode light strip 1012; and secondly, disposing the light emitting diode light strip 1012 at the end of the first backlight component 101 away from the second backlight component 102 is mainly for enhancing the utilization of the light, which is emitted by the light emitting diode light strip 1012, by the first backlight component 101.

Figure 12:
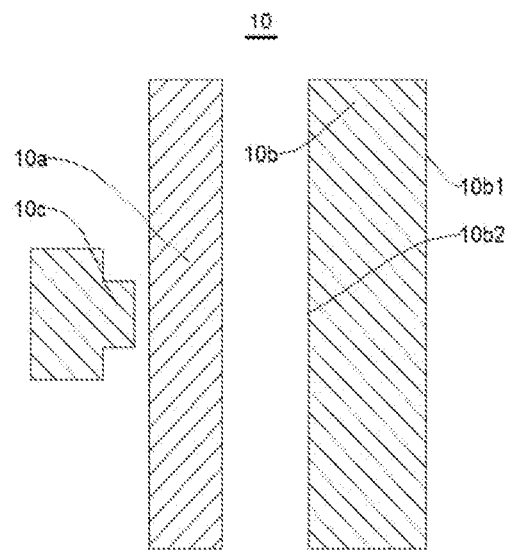
FIG. 12 is a fifth structural schematic view of the liquid crystal display screen provided by the embodiments of the present disclosure.

Specifically, refer to FIG. 12, FIG. 12 is a fifth structural schematic view of the liquid crystal display screen provided by the embodiments of the present disclosure. As shown in FIG. 12, the liquid crystal display screen 10 provided by the embodiments of the present disclosure includes the backlight module 10a, the liquid crystal display panel 10b, and the optical component 10c. Wherein, the liquid crystal display panel 10b includes the first surface 10b1 and the second surface 10b2 disposed opposite each other, the backlight module 10a is disposed on the second surface 10b2 of the liquid crystal display panel 10b, and the optical component 10c is disposed on the surface of the first backlight component 101 away from the liquid crystal display panel 10b.

Wherein, it is understandable that when the backlight module 10a is in the backlight state, the transmission path of the light emitted by the backlight module 10a is changed to form the uniform plane light source, so that the backlight module 10a provides backlight for the liquid crystal display panel 10 as the backlight source, and when the backlight module 10a is in the transparent state, the light from inside and outside of the liquid crystal display screen 10 can be transmitted through the liquid crystal display panel 10b and the backlight module 10a, so that the optical component 10c may function normally.

Therefore, by applying the backlight module 10a, the optical component 10c can receive the light from outside of the liquid crystal display screen 10 without the reservation of the notch or the opening on the liquid crystal display panel 10b or popping the optical component 10c by pop-up means, thereby solving the technical problem that the conventional liquid crystal display screen 10 is opaque to light, and thereby meeting the need for front surface optical component without disrupting the integrality of the full screen display and increasing the possibility of cellphone damages and the repair costs of the cellphones. In addition, by applying the backlight module 10a, the normal display and a usage of the optical component 10c can be achieved on the same liquid crystal display screen 10, which provides the possibility for the implementation of the true mechanical-structure-free liquid crystal full screen display.

Wherein, in an implementation, the optical component 10c includes one or more of a camera, an optical fingerprint reader, a light sensor, and a distance sensor.

Figure 13:
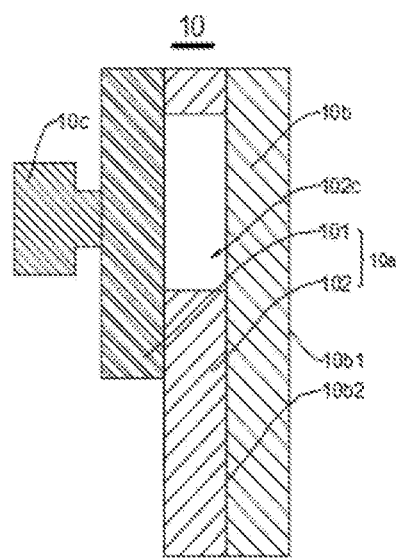
FIG. 13 is a sixth structural schematic view of the liquid crystal display screen provided by the embodiments of the present disclosure.

Specifically, refer to FIG. 13. FIG. 13 is a sixth structural schematic view of the liquid crystal display screen provided by the embodiments of the present disclosure. As shown in FIG. 13, the liquid crystal display screen 10 provided by the embodiments of the present disclosure comprises the backlight module 10a, the liquid crystal display panel 10b, and the optical component 10c. Wherein, the backlight module 10a includes the first backlight component 101 and the second backlight component 102.

Wherein, the liquid crystal display panel 10b includes the first surface 10b1 and the second surface 10b2 disposed opposite each other, the first backlight component 101 is disposed on the second surface 10b2 of the liquid crystal display panel 10b, the optical component 10c is disposed on the surface of the first backlight component 101 away from the liquid crystal display panel 10b, the second backlight component 102 is disposed on the second surface 10b2 of the liquid crystal display panel 10b, the second backlight component 102 is also disposed between the liquid crystal display panel 10b and the optical component 10c, and the through hole 102c is formed in the middle portion of the second backlight component 102. In addition, the first backlight component 101 is disposed on the side of the second backlight component 102 away from the liquid crystal display panel 10b, the first backlight component 101 covers the through hole 102c, and the optical component 10c is opposite the through hole 102c.

Wherein, it is understandable that because the utilization of light by the first backlight component 101 is insufficient, the second backlight component 102 may be added between the optical component 10c and the liquid crystal display panel 10b, so as to make the second backlight component 102 also serve as the backlight source of the liquid crystal display panel 10b. By doing so, the liquid crystal display panel 10b is added with the new backlight source, and therefore, even if the utilization of light by the first backlight component 101 is insufficient, the liquid crystal display panel 10b can be provided with sufficient backlight with the first backlight component 102 and first backlight component 101 both serving as the backlight sources of the liquid crystal display panel 10b.

Wherein, it is understandable that the first backlight component 101 is disposed on the side of the second backlight component 102 away from the liquid crystal display panel 10b. Therefore, the light emitted from the second backlight component 102 towards the liquid crystal display panel 10b is not affected by the first backlight component 101.

However, the light from outside of the liquid crystal display screen 10 and the light from inside of the liquid crystal display screen 10 are both affected by the second backlight component 102 when transmitted to inside of the liquid crystal display screen 10 and outside of the liquid crystal display screen 10, respectively. Therefore, the through hole 102c is formed in the middle portion of the second backlight component 102, and the optical component 10c and the through hole 102c is disposed opposite each other. Therefore, when the first backlight component 101 is in the transparent state, the light from outside of the liquid crystal display screen 10 can be transmitted to the optical component 10c, and the transmission of the light from the optical component 10c to outside of the liquid crystal display screen 10 is also not affected.

Hence, not only does such disposal solve the technical problem that the utilization of light by the first backlight component 101 is insufficient, and therefore cause a deterioration in display effect of the liquid crystal display screen 10, it but also accomplishes this without affecting the effect that the normal display of the liquid crystal display screen 10 and the usage of the optical component 10c may be achieved on the same liquid crystal display screen 10.

Wherein, in an implementation, the second backlight component 102 includes the shading layer and the backlight layer disposed on one side of the shading layer, the shading layer is disposed on the side of the second backlight component 102 away from the liquid crystal display panel 10b, and the backlight layer is disposed on the side of the second backlight component 102 close to the liquid crystal display panel 10b. Wherein, the backlight layer is used to emit backlight toward the liquid crystal display panel 10b, and the shading layer is used to prevent the backlight layer from emitting the backlight toward other directions whereat the liquid crystal display panel 10b cannot receive the backlight, thereby increasing the amount of backlight that the liquid crystal display panel 10b can receive, enhancing the backlight utilization of the second backlight component 102, and thereby improving the display effect of the liquid crystal display panel.

Wherein, in an implementation, one end of the first backlight component 101 is higher than the second backlight component 102, and the light emitting diode light strip 1012 is disposed at this end. Wherein, it is understandable that because the other end of the first backlight component 101 is in parallel with the other end of the second backlight component 102, the space in which the light emitting diode light strip 1012 is disposed needs to be enlarged, and therefore the costs are increased, if the light emitting diode light strip 1012 is disposed at the other end. Therefore, the light emitting diode light strip 1012 is generally disposed at the end of the first backlight component 101 unparallel to the second backlight component.

Figure 14:
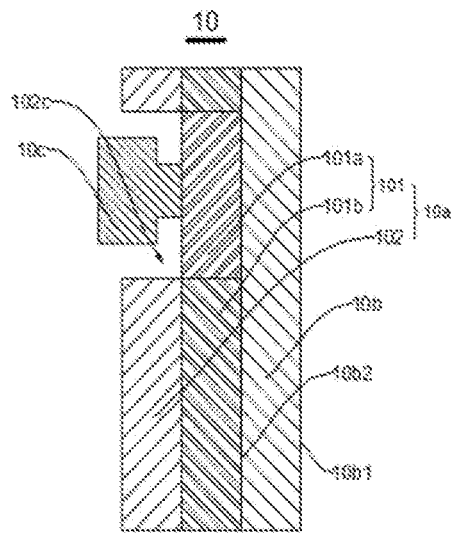
FIG. 14 is a seventh structural schematic view of the liquid crystal display screen provided by the embodiments of the present disclosure.

Specifically, refer to FIG. 14. FIG. 14 is a seventh structural schematic view of the liquid crystal display screen provided by the embodiments of the present disclosure. As shown in FIG. 14, the liquid crystal display screen 10 provided by the embodiments of the present disclosure comprises the backlight module 10a, the liquid crystal display panel 10b, and the optical component 10c. Wherein, the backlight module 10a includes the first backlight component 101 and the second backlight component 102.

Wherein, the liquid crystal display panel 10b includes the first surface 1021 and the second surface 1022 disposed opposite each other, the first backlight component 101 is disposed on the second surface 1022 of the liquid crystal display panel 10b, the optical component 10c is disposed on the surface of the first backlight component 101 away from the liquid crystal display panel 10b, the second backlight component 102 is disposed on the second surface 1022 of the liquid crystal display panel 10b, and the second backlight component 102 is also disposed between the liquid crystal display panel 101 and the optical component 10c. The through hole 102c is formed in the middle portion of the second backlight component 102, and the optical component 10c is disposed inside the through hole 102c. The first backlight component 101 is disposed on the side of the second backlight component 102 close to the liquid crystal display panel 10b, the first backlight component 101 includes the first part 102a and the second part 102b disposed at the both ends of the first part 102a. Wherein, the first part 102a is disposed opposite the through hole 102c.

Wherein, it is understandable that the first backlight component 101 is disposed on the side of the second backlight component 102 close to the liquid crystal display panel 10b, so the light emitted by the second backlight component 102 towards the liquid crystal display panel 10b all passes the first backlight component 101, and when the first backlight component 101 is in the backlight state and serves as the backlight source of the liquid crystal display panel 10b, the transmission path of the light that passes through the first backlight component 101 is changed. Therefore, if the first backlight component 101 remains unchanged, all the light emitted by the second backlight component 102 towards the liquid crystal display panel 10b as the backlight source is changed. In that case, the second backlight component 102 cannot serve as the backlight source of the liquid crystal display panel 10b.

Therefore, the first backlight component 101 is divided into the first part 101a, and the second part 101b disposed at the both ends of the first part 101a. Wherein, the first part 101a is disposed opposite the through hole 102c, the first part 101a is in the transparent state or the backlight state, and the second part 101b is in the transparent state.

Wherein, it is understandable that the first part 101a is switchable between the transparent state and the backlight state, and the first part 101a is disposed opposite the optical component 10c. Therefore, when the first part 101a of the first backlight component 101 is in the transparent state, light from inside and outside of the liquid crystal display screen 10 may be transmitted through the liquid crystal display panel 10b and the first backlight component 101, so that the optical component 10c may function normally, and when the first part 101a of the first backlight component 101 is in the backlight state, the first backlight component 101 may serve as the backlight source of the liquid crystal display panel 10b.

Wherein, it is understandable that the second part 101b is in the transparent state, and therefore the second part 101b of the adjustable transparent backlight panel 102 does not change the transmission path of the light emitted by the second backlight component 102 towards the liquid crystal display panel 10b, so the light emitted by the second backlight component 102 towards the liquid crystal display panel 10b can arrive safely. Therefore, the light received by the liquid crystal display panel 10b can be increased, thereby enhancing the display effect of the liquid crystal display panel 10b.

Wherein, in an implementation, the light emitting diode light strip 1012 is disposed at the shorter end of the second part 101b of the first backlight component 101. Wherein, it is understandable that the transmission path of the light emitted by the light emitting diode light strip needs to be adjusted by the first part 101a of the first backlight component 101, and the longer the distance that the light travails through the second part 101b of the first backlight component 101, the more of the light is lost. Therefore, in order to enhance the utilization of the light emitted by the light emitting diode light strip 1012, the light emitting diode light strip 1012 is generally disposed at the shorter end of the second part 101b of the first backlight component 101. In addition, the position of the projection of the light emitting diode light strip 1012 does not coincide with the second backlight component 102. This is mainly for preventing the light emitting diode light strip 1012 from affecting the light transmitted by the second backlight component 102 to the liquid crystal display panel 10b, so as to further enhance the utilization of the light.

Figure 15:
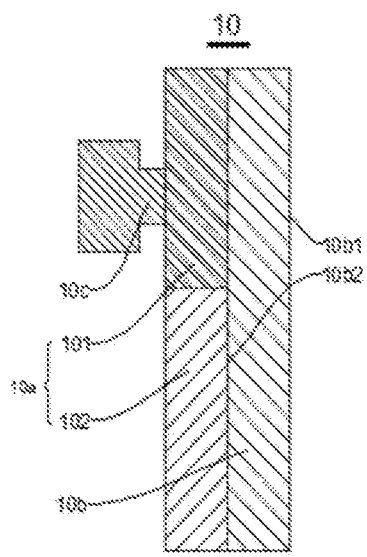
FIG. 15 is an eighth structural schematic view of the liquid crystal display screen provided by the embodiments of the present disclosure.

Specifically, refer to FIG. 15. FIG. 15 is an eighth structural schematic view of the liquid crystal display screen provided by the embodiments of the present disclosure. As shown in FIG. 15, the liquid crystal display screen 10 provided by the embodiments of the present disclosure comprises the backlight module 10a, the liquid crystal display panel 10b, and the optical component 10c. Wherein, the backlight module 10a includes the first backlight component 101 and the second backlight component 102.

Wherein, the liquid crystal display panel 10b includes the first surface 102a and the second surface 102b disposed opposite each other, the first backlight component 101 is disposed on the second surface 102b of the liquid crystal display panel 10b, the optical component 10c is disposed on the surface of the first backlight component 101 away from the liquid crystal display panel 10b, the second backlight component 102 is disposed on the second surface 102b of the liquid crystal display panel 10b, and the second backlight component 102 is also disposed between the liquid crystal display panel 10b and the optical component 10c. The through hole 102c is formed at the edge of one end of the second backlight component 102, the first backlight component 101 is disposed inside the through hole 102c, and the first backlight component 101 and the second backlight component 102 are disposed in parallel.

Wherein, it is understandable that the first backlight component 101 and the second component 102 are disposed in parallel and without particular order. Therefore, the first backlight component 101 does not block the light that passes the second backlight component 102, and the second backlight component 102 does not block the light that passes the first backlight component 101.

In addition, the optical component 10c is disposed on the surface of the first backlight component 101 away from the liquid crystal display panel 10b, and therefore both the transmission of the light from outside of the liquid crystal display screen 10 to the optical component 10c and the transmission of the light from the optical component 10c to outside of the liquid crystal display screen 10 are not affected by the second backlight component 102.

Therefore, by switching the first backlight component 101 between the backlight state and the transparent state, the normal display and the usage of the optical component 10c can be achieved on the same liquid crystal display screen 10, and thus provides the possibility for the implementation of the true mechanical-structure-free liquid crystal full screen display.

Wherein, in an implementation, the light emitting diode light strip 1012 is disposed at the end of the first backlight component 101 away from the second backlight component 102, and the position of the projection of the light emitting diode light strip 1012 does not coincide with the liquid crystal display panel 10b. Wherein, it is understandable that, firstly, the position of the projection of the light emitting diode light strip 1012 not coinciding with the liquid crystal display panel 10b is mainly for preventing both the light emitted from the optical component 10c to the outside of the liquid crystal display screen 10 and the light emitted from the liquid crystal display screen 10 to the optical component 10c from being blocked by the light emitting diode light strip 1012; and secondly, disposing the light emitting diode light strip 1012 at the end of the first backlight component 101 away from the second backlight component 102 is mainly for enhancing the utilization of the light, which is emitted by the light emitting diode light strip 1012, by the first backlight component 101.

In the liquid crystal display screen provided by the embodiments of the present disclosure, by disposing the backlight module switchable between the transparent state and the backlight state, and by making the backlight module being in the transparent state, in which the light from inside and outside of the liquid crystal display screen may be transmitted through the liquid crystal display panel and the backlight module, when using the optical component, the normal usage of the optical component is not affected, whereas when the backlight module needs the backlight, the backlight module is made to be in the backlight state, in which the backlight module provides the backlight for the liquid crystal display panel as the backlight source. Therefore, by applying the backlight module switchable between the transparent state and the backlight state, normal display and usage of the optical component may be achieved on the same liquid crystal display screen, and an implementation of the true mechanical-structure-free liquid crystal full screen display is made possible. In addition, the backlight module does not need to reserve the notch or the opening on the liquid crystal display screen or pop the optical component by pop-up means, and therefore does not disrupt the integrality of the full screen display or increase the possibility of cellphone damages and the repair costs of the cellphones. Therefore, the liquid crystal display screen provided by the embodiments of the present disclosure may solve the technical problem that the conventional liquid crystal display screens are opaque to light, without disrupting the integrality of the full screen display and increasing the possibility of cellphone damages and the repair costs of the cellphones.

Specifically, refer to FIG. 16. FIG. 16 is a schematic flow chart of a method for using the liquid crystal display screen provided by the embodiments of the present disclosure. As shown in FIG. 16, the method for using the liquid crystal display screen provided by the embodiments of the present disclosure comprises steps of:

Step 201, when the optical component receives light, the light from the outside of the liquid crystal display screen passes the liquid crystal display panel and the backlight module in sequence and reaches the optical component, such that the optical component receives the light from the outside of the liquid crystal display screen, and step 202, when the optical component does not receive light, the path of the light emitted by the backlight module is changed to form the uniform plane light source, so that the backlight module provides backlight for the liquid crystal display panel as the backlight source.

Wherein, it is understandable that when the optical component receives the light and the backlight module is in the transparent state, the backlight module does not emit light, and the light from the outside of the liquid crystal display panel may be transmitted through the liquid crystal display panel and the backlight module to the optical component, so that the optical component receives the light from the outside of the liquid crystal display screen.

When the optical component does not receive light, the backlight module is in the backlight state, and the path of the light emitted by the backlight module is changed to form the uniform plane light source, so that the backlight module provides backlight for the liquid crystal display panel as the backlight source, thereby making the liquid crystal display panel to display an image.

Therefore, applying the method for using the liquid crystal display screen provided by the embodiments of the present disclosure, and by applying the backlight module switchable between the backlight state and the transparent state, the normal display and the usage of the optical component can be achieved on the same liquid crystal display screen, and thus provides the possibility for the implementation of the true mechanical-structure-free liquid crystal full screen display.

Figure 18:
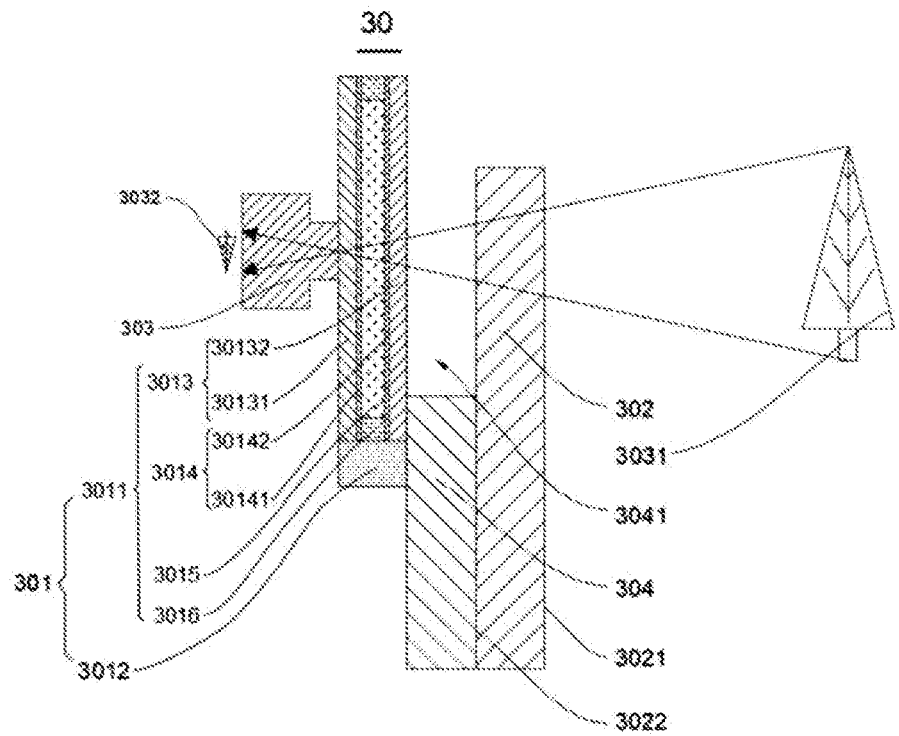
FIG. 18 is a second structural schematic view of the liquid crystal display screen applying the camera provided by the embodiments of the present disclosure.

Specifically, refer to FIG. 17 and FIG. 18. FIG. 17 is a first structural schematic view of a liquid crystal display screen applying a camera provided by the embodiments of the present disclosure, and FIG. 18 is a second structural schematic view of the liquid crystal display screen applying the camera provided by the embodiments of the present disclosure. As shown in FIG. 17 and FIG. 18, in the structural schematic views of the liquid crystal display screen applying the camera provided by the embodiments of the present disclosure, the liquid crystal display screen 30 comprises a first backlight component 301, a liquid crystal display panel 302, a camera 303, and a second backlight component 304.

Wherein, the liquid crystal display panel 302 includes a first surface 3021 and a second surface 3022 disposed opposite each other, the first backlight component 301 is disposed on the second surface 3022 of the liquid crystal display panel 302, the camera 303 is disposed on the surface of the first backlight component 301 away from the liquid crystal display panel 302, the second backlight component 304 is disposed on the second surface 3022 of the liquid crystal display panel 302, the second backlight component 304 is also disposed between the first backlight component 301 and the camera 303, and a through hole 3041 is formed in the middle portion of the second backlight component 304. In addition, the first backlight component 301 is disposed on a side of the second backlight component 304 away from the liquid crystal display panel 301, the first backlight component 301 covers the through hole 3041, and the camera 303 is disposed opposite the through hole 3041. Wherein, the first backlight component 301 includes an adjustable transparent panel 3011 and a light emitting diode light strip 3012 disposed on one side of the adjustable transparent panel 3011. Wherein, the adjustable transparent panel 3011 includes transparent base electrodes 3013, indium tin oxide electrodes 3014, a light-scattering material layer 3015, and a plastic frame 3016. The transparent base electrodes 3013 include a first transparent base electrode 30131 and a second transparent base electrode 30132. The first transparent base electrode 30131 and the second transparent base electrode 30132 are disposed opposite each other. The indium tin oxide electrodes 3014 are disposed between the first transparent base electrode 30131 and the second transparent base electrode 30132, the indium tin oxide electrodes 3014 include the first indium tin oxide electrode 30141 and the second indium tin oxide electrode 30142, and the first indium tin oxide electrode 30141 and the second indium tin oxide electrode 30142 are disposed opposite each other. The light-scattering material layer 3015 is disposed between the first indium tin oxide electrode 30141 and the second indium tin oxide electrode 30142. The plastic frame 3016 is disposed at an end of the light-scattering material layer 3015 away from the light emitting diode light strip 3012 and an end of the light-scattering material layer 3015 close to the light emitting diode light strip 3012, and the plastic frame 3016 is disposed between the first indium tin oxide electrode 30141 and the second indium tin oxide electrode 30142

Wherein, the first backlight component 301 shown in FIG. 17 is in the backlight state, and a first light transmission path 30121 shown in FIG. 17 is the light transmission path by which light transmitted from the light emitting diode light strip 3012 to inside of the adjustable transparent panel 3011 is transmitted, and a second light transmission path 30122 is the light transmission path by which light emitted to the outside of the adjustable transparent panel 3011 after adjusted by the adjustable transparent panel 3011 is transmitted.

Wherein, it is understandable that the light emitted by the light emitting diode light strip 3012 towards the adjustable transparent panel 3011 is uniformly emitted from the side of the adjustable transparent panel 3011 close to the liquid crystal display panel 302 and the side of the adjustable transparent panel 3011 away from the liquid crystal display panel 302, after being adjusted by the adjustable transparent panel 3011. Therefore, although part of the light is lost, there is still part of the light emitted from the light emitting diode light strip 3012 emitted towards the liquid crystal display panel 302 after being adjusted by the adjustable transparent panel 3011. Therefore, when the first backlight component 301 is in the backlight state, the first backlight component 301 can provide light for the liquid crystal display panel 302 as the backlight source of the liquid crystal display panel 302.

Wherein, the first backlight component 301 shown in FIG. 18 is in the transparent state, an image 3031 at a side of the liquid crystal display panel 302 away from the camera 303 is an object outside of the liquid crystal display screen 30, and an image 3032 at a side of camera 303 away from the liquid crystal display panel 301 is a picture of the object outside of the liquid crystal display screen 30 formed by the camera 303.

Wherein, it is understandable that the first backlight component 301 is in the transparent state, and the adjustable transparent panel 3011 does not change a transmission path of the light transmitted from outside of the liquid crystal display screen 30 to the camera 303 or change a transmission path of the light transmitted from the camera 303 to the outside of the liquid crystal display screen 30. Therefore, the object in the surroundings can form a clear image on the camera 303.

Therefore, by applying the backlight module switchable between the transparent state and the backlight state, the normal display and the usage of the camera can be achieved on the same liquid crystal display screen, and thus provides the possibility for the implementation of the true mechanical-structure-free liquid crystal full screen display.

Figure 19:
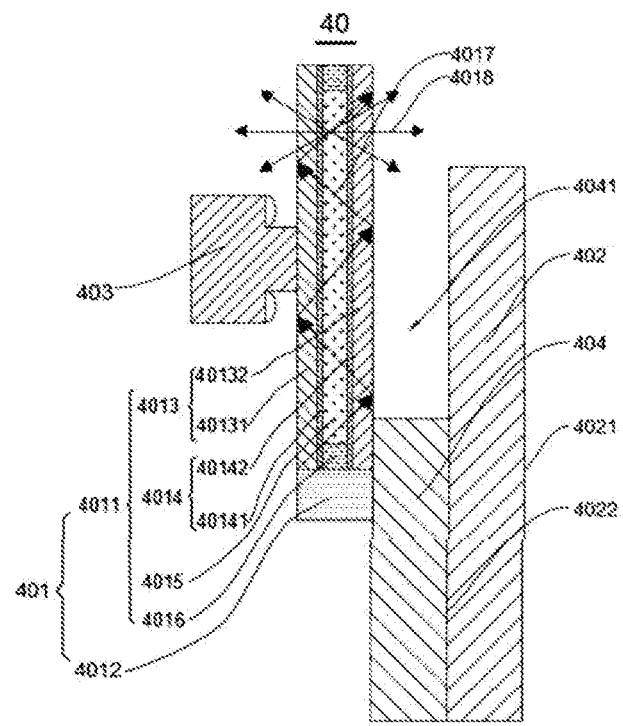
FIG. 19 is a first structural schematic view of a liquid crystal display screen applying an optical fingerprint reader provided by the embodiments of the present disclosure.
Figure 20:
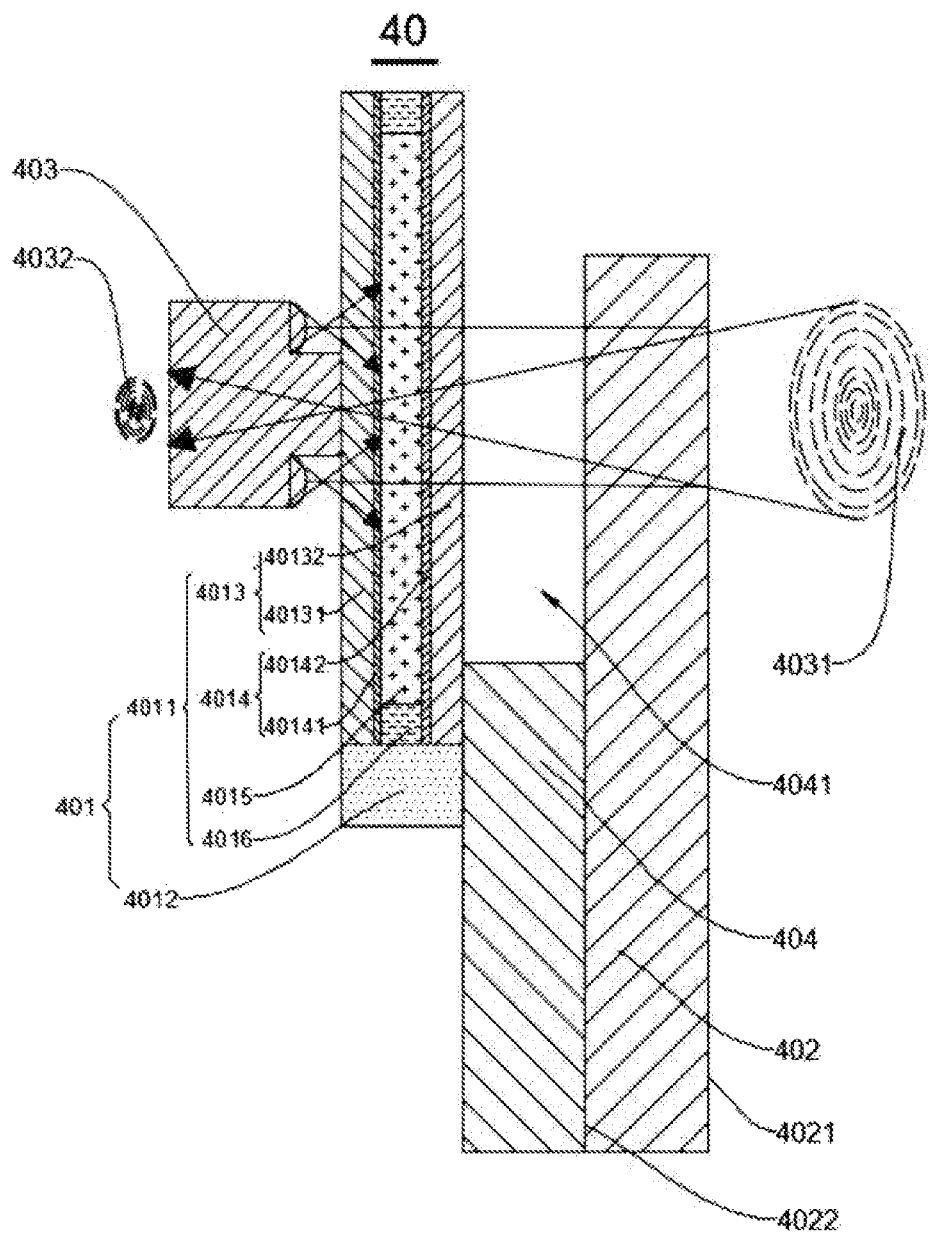
FIG. 20 is a second structural schematic view of the liquid crystal display screen applying the optical fingerprint reader provided by the embodiments of the present disclosure.

Specifically, refer to FIG. 19 and FIG. 20. FIG. 19 is a first structural schematic view of a liquid crystal display screen applying an optical fingerprint reader provided by the embodiments of the present disclosure and FIG. 20 is a second structural schematic view of the liquid crystal display screen applying the optical fingerprint reader provided by the embodiments of the present disclosure. As shown in FIG. 19 and FIG. 20, in the structural schematic views of the liquid crystal display screen applying the optical fingerprint reader provided by the embodiments of the present disclosure, a liquid crystal display screen 40 comprises a first backlight component 401, a liquid crystal display panel 402, an optical fingerprint reader 403, and a second backlight component 404. Wherein, the liquid crystal display panel 402 includes a first surface 4021 and a second surface 4022 disposed opposite each other, the first backlight component 401 is disposed on the second surface 4022 of the liquid crystal display panel 402, the optical fingerprint reader 403 is disposed on a surface of the first backlight component 401 away from the liquid crystal display panel 402, the second backlight component 404 is disposed on the second surface 4022 of the liquid crystal display panel 402, the second backlight component 404 is also disposed between the liquid crystal display panel 401 and the optical fingerprint reader 403, and a through hole 4041 is formed in the middle portion of the second backlight component 404. In addition, the first backlight component 401 is disposed on a side of the second backlight component 404 away from the first backlight component 401, the first backlight component 401 covers the through hole 4041, and the optical fingerprint reader 403 is disposed opposite the through hole 4041. Wherein, the first backlight component 401 includes an adjustable transparent panel 4011 and a light emitting diode light strip 4012 disposed on one side of the adjustable transparent panel 4011. Wherein, the adjustable transparent panel 4011 includes transparent base electrodes 4013, indium tin oxide electrodes 4014, a light-scattering material layer 4015, and a plastic frame 4016. The transparent base electrodes 4013 include a first transparent base electrode 40131 and a second transparent base electrode 40132. The first transparent base electrode 40131 and the second transparent base electrode 40132 are disposed opposite each other. The indium tin oxide electrodes 4014 are disposed between the first transparent base electrode 40131 and the second transparent base electrode 40132, the indium tin oxide electrodes 4014 include the first indium tin oxide electrode 40141 and the second indium tin oxide electrode 40142, and the first indium tin oxide electrode 40141 and the second indium tin oxide electrode 40142 are disposed opposite each other. The light-scattering material layer 4015 is disposed between the first indium tin oxide electrode 40141 and the second indium tin oxide electrode 40142. The plastic frame 4016 is disposed at an end of the light-scattering material layer 4015 away from the light emitting diode light strip 4012 and an end of the light-scattering material layer 4015 close to the light emitting diode light strip 4012, and the plastic frame 4016 is disposed between the first indium tin oxide electrode 40141 and the second indium tin oxide electrode 40142.

Wherein, the first backlight component 401 shown in FIG. 19 is in the backlight state, and a first light transmission path 40121 shown in FIG. 19 is the light transmission path by which light transmitted from the light emitting diode light strip 4012 to the inside of the adjustable transparent panel 4011 is transmitted, and a second light transmission path 40122 is the light transmission path by which light emitted to the outside of the adjustable transparent panel 4011 after being adjusted by the adjustable transparent panel 4011 is transmitted.

Wherein, it is understandable that the light emitted by the light emitting diode light strip 4012 towards the adjustable transparent panel 4011 is uniformly emitted from the side of the adjustable transparent panel 4011 close to the liquid crystal display panel 402 and the side of the adjustable transparent panel 4011 away from the liquid crystal display panel 402. Therefore, although part of the light is lost, there is still part of the light emitted from the light emitting diode light strip 4012 emitted towards the liquid crystal display panel 402 after being adjusted by the adjustable transparent panel 4011. Therefore, when the first backlight component 401 is in the backlight state, the first backlight component 401 can provide light for the liquid crystal display panel 402 as the backlight source of the liquid crystal display panel 402.

Wherein, the first backlight component 401 shown in FIG. 20 is in the transparent state, an image 4031 at a side of the liquid crystal display panel 402 away from optical fingerprint reader 403 is a fingerprint to be read, and an image 4032 at a side of the optical fingerprint reader 403 away from the liquid crystal display panel 402 is an image of the fingerprint to be recognized, formed by the optical fingerprint reader 403.

Wherein, in an implementation, the optical fingerprint reader 403 includes a short focal camera and the light emitting diode light strip. Wherein, the light emitting diode light strip is disposed on the side of the optical fingerprint reader 403 close to the liquid crystal display panel 402.

Wherein, it is understandable that when using optical fingerprint reader 403, the first backlight component 401 is in the transparent state, and thus cannot provide light for the liquid crystal display panel 402. Therefore, the light emitting diode is needed to illuminate the image 4031 of the fingerprint on the liquid crystal display panel 402, so that the short focal camera may obtain the image 4032 of the fingerprint to be read by imaging.

Wherein, it is understandable that the first backlight component 401 is in the transparent state, and the adjustable transparent panel 4011 does not change the light transmitted from outside of the liquid crystal display screen 40 to the optical fingerprint reader 403 or change the light transmitted from the optical fingerprint reader 403 to the outside of the liquid crystal display screen 40. Therefore, specific features of the fingerprint to be recognized can be present clearly on the optical fingerprint reader 403.

Therefore, by applying the backlight module switchable between the backlight state and the transparent state, the normal display and the usage of the optical fingerprint reader can be achieved on the same liquid crystal display screen, and thus provides the possibility for the implementation of the true mechanical-structure-free liquid crystal full screen display.

Figure 21:
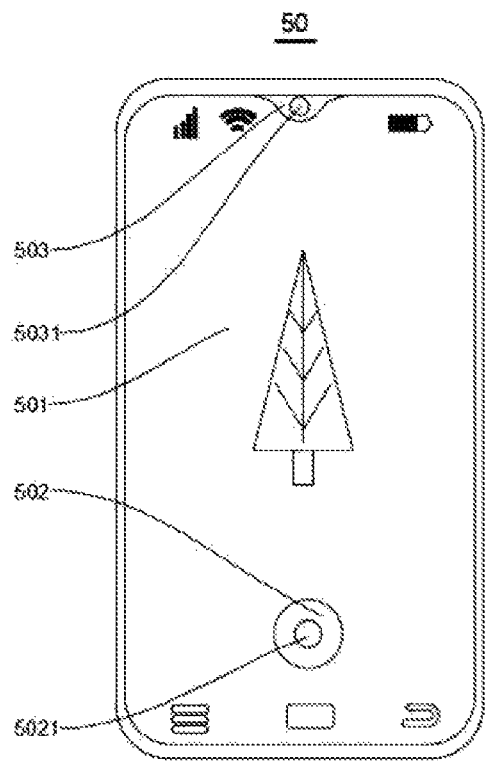
FIG. 21 is a first structural schematic view of the backlight module provided by the embodiments of the present disclosure being applied to a cellphone liquid crystal display screen.
Figure 22:
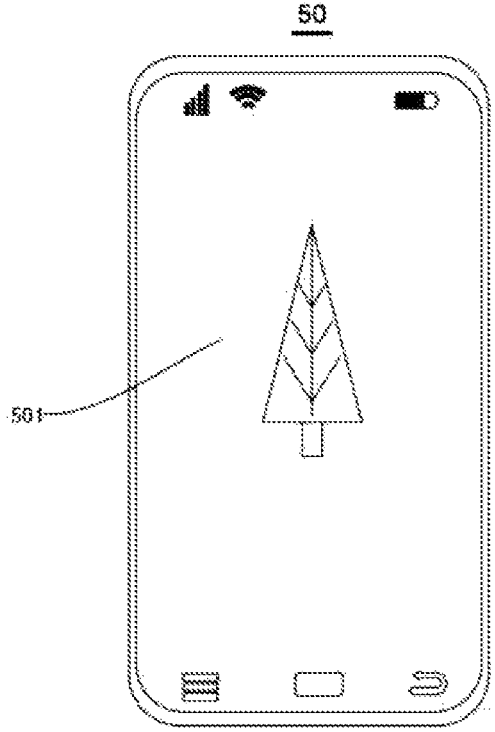
FIG. 22 is a second structural schematic view of the backlight module provided by the embodiments of the present disclosure being applied to the cellphone liquid crystal display screen.

Specifically, refer to FIG. 21 and FIG. 22. FIG. 21 is a first structural schematic view of the backlight module provided by the embodiments of the present disclosure being applied to a cellphone liquid crystal display screen and FIG. 22 is a second structural schematic view of the backlight module provided by the embodiments of the present disclosure being applied to the cellphone liquid crystal display screen. As shown in FIG. 21 and FIG. 22, in the structural schematic views of the backlight module provided by the embodiments of the present disclosure being applied to the cellphone liquid crystal display screen, a cellphone liquid crystal display screen 50 comprises a normal display area 501, a fingerprint reading area 502, and a camera opening area 503. Wherein, a camera 5031 is disposed in the camera opening area 503 and an optical fingerprint reader 5021 is disposed in the fingerprint reading area 502.

Wherein, the cellphone liquid crystal display screen shown in FIG. 21 is the cellphone liquid crystal display screen when the backlight module is in the transparent state. At this moment, the backlight module in the camera opening area 503 and the fingerprint reading area 502 is in the transparent state, and the camera 5031 and the optical fingerprint reader 5021 can receive light from outside of the cellphone liquid crystal display screen 50 or transmit light to outside of the cellphone liquid crystal display screen 50. At this moment, the camera 5031 and the optical fingerprint reader 5021 can function normally, and the backlight module in the normal display area 501 is still in the backlight state, and therefore the normal display area 501 of the cellphone liquid crystal display screen 50 still displays normally.

The cellphone liquid crystal display screen shown in FIG. 22 is the cellphone liquid crystal display screen when the backlight module is in the backlight state. At this moment, the backlight module in the normal display area 501, the camera opening area 503, and the fingerprint reading area 502 are all in the backlight state, and the cellphone liquid crystal display screen 50 can display full-screen, and thus achieve full screen display.

Therefore, by applying the backlight module switchable between the backlight state and the transparent state, the normal display and the usage of the camera and optical fingerprint reader can be achieved on the same liquid crystal display screen, and thus provides the possibility for the implementation of the true mechanical-structure-free liquid crystal full screen display.

In addition, in an implementation, not only can the backlight module be applied to the cellphone liquid crystal display screen, it can also be applied in usage scenarios in which the liquid crystal display screen with super-high screen-to-body ratio or hidden optical component are needed, such as being used in the display panel of large size television or display panel of wearable display devices.

In the aforementioned embodiments, the description of each embodiment has its own emphasis. For a part that is not detailed in an embodiment, refer to related descriptions in other embodiments.

The backlight module, the liquid crystal display screen, and the using method thereof provided by the embodiments of the present disclosure are described in detail hereinabove. Specific examples are used herein to elaborate the principles and implementations of the present disclosure. The descriptions of the above embodiments are used only to help understand the technical solution and the main idea of the present disclosure. It can be understood by one of ordinary skill in the art that modifications can still be made to the technical solution described in the aforementioned embodiments, or equivalent substitutions can be made to part of the technical features of the aforementioned embodiments without depart from the scope of the technical solutions of the embodiments of the present disclosure.

What is claimed is:

1. A backlight module, comprising a first backlight component and a second backlight component, wherein the first backlight component and the second backlight component are disposed opposite each other, the first backlight component includes a first side and a second side opposite each other, and the second backlight component is disposed on the first side or the second side; or wherein the first backlight component and the second backlight component are disposed in parallel, the first backlight component includes a first end and a second end opposite each other, and the second backlight component is disposed at the first end or the second end;

wherein the first backlight component includes an adjustable transparent panel and a light emitting diode light strip disposed at one end of the adjustable transparent panel;

when the light emitting diode light strip switches on and the adjustable transparent panel is in a backlight state, a path of light emitted by the light emitting diode light strip towards the adjustable transparent panel is changed to form a uniform plane light source; and when the light emitting diode light strip switches off and the adjustable transparent panel is in a transparent state, light from outside of the backlight module is transmitted through the adjustable transparent panel.

2. The backlight module as claimed in claim 1, wherein the adjustable transparent panel includes transparent base electrodes, indium tin oxide electrodes, and a light-scattering material layer;

wherein the transparent base electrodes include a first transparent base electrode and a second transparent base electrode disposed opposite each other;

wherein the indium tin oxide electrodes are disposed between the first transparent base electrode and the second transparent base electrode, the indium tin oxide electrodes include a first indium tin oxide electrode and a second indium tin oxide electrode, and the first transparent base electrode and the second transparent base electrode are disposed opposite each other;

and wherein the light-scattering material layer is disposed between the first indium tin oxide electrode and the second indium tin oxide electrode.

3. The backlight module as claimed in claim 2, wherein when a first voltage is applied to the indium tin oxide electrodes, light-scattering material in the light-scattering material layer is excited, and scatters light emitted by the light emitting diode light strip towards the adjustable transparent panel, so as to change the path of the light emitted by the light emitting diode light strip towards the adjustable transparent panel, and form the uniform plane light source; and when a second voltage is applied to the indium tin oxide electrodes, the light-scattering material in the light-scattering material layer is not excited, the adjustable transparent panel is in the transparent state, and light from outside of the adjustable transparent panel is transmitted through the adjustable transparent panel.

4. The backlight module as claimed in claim 2, wherein the adjustable transparent panel further includes a plastic frame, the plastic frame is disposed at an end of the light-scattering material layer away from the light emitting diode light strip and at an end of the light-scattering material layer close to the light emitting diode light strip, and is disposed between the first indium tin oxide electrode and the second indium tin oxide electrode.

5. The backlight module as claimed in claim 1, wherein the second backlight component is disposed on the first side, a through hole is formed in a middle portion of the second backlight component, and the first backlight component covers the through hole.

6. The backlight module as claimed in claim 1, wherein the second backlight component is disposed on the second side, a through hole is formed in a middle portion of the second backlight component, and the first backlight component includes a first part and a second part disposed at both ends of the first part; wherein the first part is disposed opposite the through hole, the first part is in the transparent state or the backlight state, and the second part is in the transparent state.

7. A liquid crystal display screen, comprising:

a liquid crystal display panel including a first surface and a second surface opposite each other; and a backlight module disposed on the second surface of the liquid crystal display panel and including a first backlight component and a second backlight component, wherein the first backlight component and the second backlight component are disposed opposite each other, the second backlight component includes a first side and a second side opposite each other, and the first backlight component is disposed on the first side or the second side; or wherein the first backlight component and the second backlight component are disposed in parallel, the second backlight component includes a first end and a second end opposite each other, and the first backlight component is disposed at the first end or the second end, wherein the first backlight component includes an adjustable transparent panel and a light emitting diode light strip disposed at one end of the adjustable transparent panel;

when the light emitting diode light strip switches on and the adjustable transparent panel is in a backlight state, a path of light emitted by the light emitting diode light strip towards the adjustable transparent panel is changed to form a uniform plane light source; and when the light emitting diode light strip switches off and the adjustable transparent panel is in a transparent state, light from outside of the backlight module is transmitted through the adjustable transparent panel.

8. The liquid crystal display screen as claimed in claim 7, wherein when the first backlight component is in the backlight state, a path of light emitted by the first backlight component is changed to form the uniform plane light source, so that the first backlight component provides backlight for the liquid crystal display panel as a backlight source; and when the first backlight component in the transparent state, light from inside and outside of the liquid crystal display screen is transmitted through the liquid crystal display panel and the backlight module.

9. The liquid crystal display screen as claimed in claim 7, wherein the adjustable transparent panel includes transparent base electrodes, indium tin oxide electrodes, and a light-scattering material layer;

wherein the transparent base electrodes include a first transparent base electrode and a second transparent base electrode disposed opposite each other;

wherein the indium tin oxide electrodes are disposed between the first transparent base electrode and the second transparent base electrode, the indium tin oxide electrodes include a first indium tin oxide electrode and a second indium tin oxide electrode, and the first transparent base electrode and the second transparent base electrode are disposed opposite each other;

and wherein the light-scattering material layer is disposed between the first indium tin oxide electrode and the second indium tin oxide electrode.

10. The liquid crystal display screen as claimed in claim 9, wherein when a first voltage is applied to the indium tin oxide electrodes, light-scattering material in the light-scattering material layer is excited, and scatters light emitted by the light emitting diode light strip towards the adjustable transparent panel, so as to change the path of the light emitted by the light emitting diode light strip towards the adjustable transparent panel, and form the uniform plane light source; and when a second voltage is applied to the indium tin oxide electrodes, the light-scattering material in the light-scattering material layer is not excited, the adjustable transparent panel is in the transparent state, and light from outside of the adjustable transparent panel is transmitted through the adjustable transparent panel.

11. The liquid crystal display screen as claimed in claim 9, wherein the adjustable transparent panel further includes a plastic frame, the plastic frame is disposed at an end of the light-scattering material layer away from the light emitting diode light strip and at an end of the light-scattering material layer close to the light emitting diode light strip, and is disposed between the first indium tin oxide electrode and the second indium tin oxide electrode.

12. The liquid crystal display screen as claimed in claim 7, wherein the liquid crystal display screen further comprises an optical component disposed on a surface of the first backlight component, and the surface is away from the liquid crystal display panel.

13. The liquid crystal display screen as claimed in claim 12, wherein the optical component includes one or more of a camera, an optical fingerprint reader, a light sensor, and a distance sensor.

14. The backlight module as claimed in claim 7, wherein the second backlight component includes a shading layer and a backlight layer disposed on one side of the shading layer, and the shading layer is disposed on a side of the second backlight component away from the liquid crystal display panel.

15. The liquid crystal display screen as claimed in claim 7, wherein the second backlight component is disposed on the first side, a through hole is formed in a middle portion of the second backlight component, the first backlight component covers the through hole, and an optical component is disposed opposite the through hole.

16. The liquid crystal display screen as claimed in claim 7, wherein the second backlight component is disposed on the second side, a through hole is formed in a middle portion of the second backlight component, and an optical component is disposed inside the through hole; wherein the first backlight component includes a first part and a second part disposed at both ends of the first part; wherein the first part is disposed opposite the through hole, the first part is in a transparent state or a backlight state, and the second part is in the transparent state.

\* \* \* \* \*